United States Patent Office 2,707,190
Patented Apr. 26, 1955

2,707,190

OXIDATION OF 9-HALO-11β-HYDROXY STEROIDS

Martin W. Farrar, Webster Groves, Mo., assignor to Monsanto Chemical Company, St. Louis, Mo., a corporation of Delaware No Drawing. Application October 21, 1953, Serial No. 387,517

6 Claims. (Cl. 260—397.45)

This invention relates to the synthesis of 9-halo-11-keto steroidal compounds and in particular relates to the oxidation of the 11β-hydroxy with a hypohalous acid.

In accordance with this invention it has been found that 9-halo-11β-hydroxy steroidal compounds wherein ring D is saturated and is either 5-membered or 6-membered and wherein the asymmetric carbon atoms of ABCD ring system correspond in configuration to that of the adrenal cortical hormones, which compounds may be represented structurally as follows

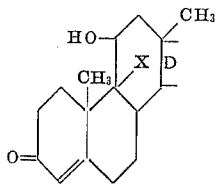

where X is a halogen atom such as bromine or chlorine, are readily convertible to the corresponding 9-halo-11-keto steroidal compound by reacting the former with a hypohalous acid such as hypochlorous acid or hypobromous acid.

As illustrative of the 9-halo-11β-hydroxy reactants contemplated by the process of this invention are Δ⁴-pregnene-9α-bromo-11β-hydroxy-3-one
Δ⁴-pregene-9α-bromo-11β-hydroxy-3,20-dione
Δ⁴-pregnene-9α-chloro-11β-hydroxy-3,20-dione
Δ⁴ - pregnene - 9α - bromo - 11β - hydroxy - 17α - methyl-3,20-dione
Δ⁴-pregnene-9α-bromo-11β,17α-dihydroxy-3,20-dione
Δ⁴ - pregnene - 9α,21 - dibromo - 11β,17α - dihydroxy-3,20-dione
Δ⁴ - pregnene - 9α - bromo - 11β,17α,21 - trihydroxy-3,20-dione-21-acetate
Δ⁴ - pregnene - 9α - chloro - 11β,17α,21 - trihydroxy-3,20-dione-21-acetate
3 - keto - 9α - bromo - 11β,16,17 - trihydroxy - Δ⁴ - D-homandrostene acetonide
3 - keto - 9α - chloro - 11β,16,17 - trihydroxy - Δ⁴ - D-homandrostene acetonide
3 - keto - 9α - bromo - 11β,16,17 - trihydroxy - Δ⁴ - D-homandrostene-16,17-diacetate
3 - keto - 9α - chloro - 11β,16,17 - trihydroxy - Δ⁴ - D-homandrostene-16,17-diacetate and the like in racemic form or in the form of their individual optically active isomers.

In the oxidation of the 11β-hydroxy substituent in accordance with the process of this invention approximately one to two chemical equivalents of the hypohalous acid may be employed, however, it is preferred that but substantially one chemical equivalent be employed. In general the reaction is carried out in a fluid medium at $-10°$ C. to 25° C., however higher or lower temperatures may be employed.

In the process of this invention it is preferred that the hypohalous acid be hypobromous acid and such can be prepared in several ways. For example, by mixing mercuric acid with bromine and water and filtering off the mercuric bromide thus formed, or by mixing N-bromoacetamide with a chemical equivalent of water and tertiary butanol, or, and preferably by mixing a solution of N-bromosuccinimide in a suitable inert organic solvent (e. g. acetone, dioxane, tertiary butanol, tetrahydrofuran and the like) with a chemical equivalent of water and a small amount of a non-oxidizing mineral acid such as sulfuric acid, perchloric acid, hydrochloric acid, hydrobromic acid, etc. By non-oxidizing mineral acid is meant a mineral acid which is incapable of oxidizing a hydroxy group to a keto group under normal conditions.

Where desired, the hypohalous acid may be prepared first and then mixed with the 9-halo-11β-hydroxy reactant. However, it is preferred that the hypohalous acid be prepared in situ, that is in the presence of the 9-halo-11β-hydroxy reactant, so that the elements of hypohalous acid react as soon as they are formed.

As illustrative of the process of this invention is the following:

Example I

To an agitated solution containing substantially 0.05 molecular proportion of dl - Δ⁴ - pregnene - 9α - bromo-11β,17α,21-trihydroxy-3,20-dione-21-acetate, 2000 parts by weight of tertiary butanol, and 400 parts by weight of water is added at about 10–15° C. approximately 50 parts by weight of 1 N sulfuric acid. To the so cooled solution is slowly added substantially 0.052 molecular proportion of N-bromo-succinimide admixed with approximately 200 parts by weight of tertiary butanol and approximately 200 parts by weight of water. Upon completion of the N-bromo-succinimide addition the mix is agitated for about one hour at 10–15° C. Thereupon a small amount of sodium sulfite is added to the solution. The resultant solution is then extracted with chloroform, the extracts combined, washed with aqueous sodium bicarbonate, washed with water, dried and then subjected to vacuum distillation at about 25–30° C. Upon recrystallizing the resultant residue from acetone an excellent yield of white crystalline dl - Δ⁴ - pregnene - 17α,21 - dihydroxy - 9α - bromo-3,11,20-trione-21-acetate is obtained. The infrared spectrum of this compound is the same as that of 9α-bromo-cortisone acetate described by Fried et al., J. A. C. S., Vol. 75, p. 2273 (1953).

In a similar manner dl-Δ⁴-pregnene-17α,21-dihydroxy-9α-chloro-3,11,20-trione-21-acetate is obtained employing dl - Δ⁴ - pregnene - 9α - chloro - 11β,17α,21 - trihydroxy-3,20-dione-21-acetate as the initial reactant instead of dl-Δ⁴ - pregnene - 9α - bromo - 11β,17α,21 - trihydroxy-3,20-dione-21-acetate.

Other 21-acylates of a ⁴Δ-pregnene-9α-halo-11β,17α,21-trihydroxy-3,20-dione may be employed than the acetate, as for example the propionate, n-butyrate, isobutyrate, the various pentanoates and the like.

Heretofore in the preparation of the 9-halo-11 keto steroidal compound chromic acid or a chromium oxide-pyridine complex was employed in oxidizing the 11β-hydroxy substituent of the 9-halo-11β-hydroxy reactant, said reactant being prepared by the addition of a hypohalous acid to the 9,11-double bond of a steroidal compound wherein ring D is saturated and is either 5-membered or 6-membered and wherein the asymmetric carbon atoms of the ABCD ring system correspond in configuration to that of the adrenal cortical hormones, which compounds may be represented structurally as follows

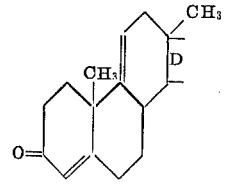

Examples of such steroidal compounds are

Δ⁴,⁹⁽¹¹⁾-pregnadiene-3-one
Δ⁴,⁹⁽¹¹⁾-pregnadiene-3,20-dione
Δ⁴,⁹⁽¹¹⁾-pregnadiene-17α-methyl-3,20-dione
Δ⁴,⁹⁽¹¹⁾-pregnadiene-17α-hydroxy-3,20-dione
Δ⁴,⁹⁽¹¹⁾-pregnadiene-21-bromo-17α-hydroxy-3,20-dione
Δ⁴,⁹⁽¹¹⁾ - pregnadiene - 17α,21 - dihydroxy - 3,20 - dione-21 acetate
3 - keto - 16,17 - dihydroxy - Δ⁴,⁹⁽¹¹⁾ - D - homandrostadiene acetonide
3 - keto - 16,17 - dihydroxy - Δ⁴,⁹⁽¹¹⁾ - D - homandrostadiene-16,17-diacetate
and the like.

Employing a Δ⁴,⁹⁽¹¹⁾steroidal compound of the type aforescribed as the initial reactant, the process of this invention provides in effect a one-step process for the preparation of a 9-halo-11-keto steroidal compound by reacting the former with substantially two chemical equivalents of a hypohalous acid, the source of the hypohalous acid being the same as that for preparing the intermediary 9-halo-11β-hydroxy compound. It is preferred that this one-step process be carried out in a fluid medium at a temperature in the range of −10° C. to about 25° C., however, where desired higher or lower temperatures may be employed. As illustrative of this aspect of the present invention is the following.

Example II

To an agitated solution containing approximately 10.0 parts by weight of the dextro-rotatory form of Δ⁴,⁹⁽¹¹⁾-pregnadiene - 17α,21 - dihydroxy - 3,20 - dione - 21-acetate (substantially 0.026 mol.) 1000 parts by weight of dioxane and 200 parts by weight of water is added at about 15° C. approximately 50 parts by weight of 10% aqueous perchloric acid. To the so cooled and acidified solution is slowly added 7.2 parts by weight of N-bromo-acetamide (substantially 0.0522 mol.) admixed with approximately 100 parts by weight of dioxane and approximately 100 parts by weight of water. Upon completion of the N-bromo-acetamide addition the mix is agitated for about two hours at about 15° C. To the resultant solution is added a small amount of sodium sulfite in the form of an aqueous solution. The solution is then extracted with chloroform, the extracts are combined, washed with aqueous sodium bicarbonate, washed with water, dried and then subjected to vacuum distillation at about 30° C. Upon recrystallizing the residue so obtained an excellent yield of white crystalline Δ⁴-pregnene-17α,21 - dihydroxy - 9α - bromo - 3,11,20 - trione - 21-acetate is obtained. This optically active compound is identical with 9α-bromo-cortisone-acetate described by Fried et al., J. A. C. S., Vol. 75, p. 2273 (1953).

Employing instead of N-bromo-acetamide a substantially equimolecular proportion of N-bromo-succinimide in Example II an excellent yield of Δ⁴-pregnene-17α,21-dihydroxy-9α-bromo-3,11,20-trione-21-acetate is obtained.

Instead of the acetate in Example II other esters of Δ⁴,⁹⁽¹¹⁾-pregnadiene-17α,21-dihydroxy-3,20-dione may be employed as for example the 21-propionate, the 21-butyrate, the 21-isobutyrate, the various 21-pentanoates and the like.

While this invention has been described with respect to certain embodiments it is not so limited and it is to be understood that variations and modifications thereof obvious to those skilled in the art may be made without departing from the spirit or scope of this invention.

What is claimed is:

1. The process of oxidizing an 11β-hydroxy group of a 9-halo-11β-hydroxy steroidal compound wherein ring D is selected from the group consisting of 5-membered and 6-membered saturated carbocylic rings fused to a nucleus of the structural formula

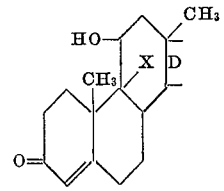

where X is a halogen atom to an 11-keto group which comprises reacting said 9-halo-11β-hydroxy steroidal compound with a hypohalous acid.

2. The process of making a Δ⁴-pregnene-17α,21-dihydroxy-9α-halogen-3,11,20-trione-21-acylate which comprises admixing and reacting substantially one chemical equivalent of a hypohalous acid with a Δ⁴-pregnene-11β,17α,21-trihydroxy-9α-halogen-3,20-dione-21-acylate.

3. The one-step process of making a Δ⁴-pregnene-17α,21 - dihydroxy - 9α - halogen - 3,11,20 - trione - 21-acylate which comprises reacting substantially two chemical equivalents of a hypohalous acid with a Δ⁴,⁹⁽¹¹⁾-pregnadiene-17α,21-dihydroxy-3,20-dione-21-acylate.

4. The one-step process of making Δ⁴-pregnene-17α,21-dihydroxy-9α-bromo-3,11,20-trione-21-acetate which comprises admixing and reacting substantially two chemical equivalents of hypobromous acid with Δ⁴,⁹⁽¹¹⁾-pregnadiene-17α,21-dihydroxy-3,20-dione-21-acetate at a temperature in the range of −10° C. to about 25° C.

5. The one-step process of making 9α-bromo-cortisone acetate which comprises reacting substantially two chemical equivalents of N-bromo-succinimide with the dextro-rotatory form of Δ⁴,⁹⁽¹¹⁾-pregnadiene-17α,21-dihydroxy-3,20-dione-21-acetate in the presence of an inert organic solvent, at least two chemical equivalents of water and a small amount of a non-oxidizing mineral acid at a temperature in the range of −10° C. to about 25° C.

6. The one-step process of making 9α-bromo-cortisone acetate which comprises reacting substantially two chemical equivalents of N-bromo-acetamide with the dextro-rotatory form of Δ⁴,⁹⁽¹¹⁾-pregnadiene-17α,21-dihydroxy-3,20-dione-21-acetate in the presence of an inert organic solvent, at least two chemical equivalents of water and a small amount of non-oxidizing mineral acid at a temperature in the range of −10° C. to about 25° C.

References Cited in the file of this patent

UNITED STATES PATENTS 2,403,683    Reichstein _____ July 9, 1946

FOREIGN PATENTS 653,480    Great Britain _____ May 16, 1951

OTHER REFERENCES

Fieser et al., Journal Am. Chem. Soc. 73, 4053–4 (1951).
Von Euw et al., Helv. Chim. Acta 27, 1287–96 (1944).